(12) United States Patent
Zeng et al.

(10) Patent No.: US 11,837,234 B2
(45) Date of Patent: Dec. 5, 2023

(54) SUBTITLE GENERATION METHOD AND APPARATUS, AND DEVICE AND STORAGE MEDIUM

(71) Applicant: Beijing Bytedance Network Technology Co., Ltd., Beijing (CN)

(72) Inventors: Yan Zeng, Beijing (CN); Weiyi Chang, Beijing (CN); Pingfei Fu, Beijing (CN); Qifan Zheng, Beijing (CN); Zhaoqin Lin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/087,631

(22) Filed: Dec. 22, 2022

(65) Prior Publication Data

US 2023/0128946 A1   Apr. 27, 2023

Related U.S. Application Data

(63) Continuation of application No. PCT/CN2021/107845, filed on Jul. 22, 2021.

(30) Foreign Application Priority Data

Jul. 23, 2020   (CN) .......................... 202010719394.1

(51) Int. Cl.
  *G10L 15/26*   (2006.01)
  *G06F 16/33*   (2019.01)
  *G06F 40/166*  (2020.01)

(52) U.S. Cl.
  CPC .......... *G10L 15/26* (2013.01); *G06F 16/3344* (2019.01); *G06F 40/166* (2020.01)

(58) Field of Classification Search
  CPC .. G06B 1/25; H04B 1/25; H04M 1/25; H04N 1/25; H04L 1/25; G06N 1/25; H04R 1/25; H04W 1/25
  See application file for complete search history.

(56) References Cited

U.S. PATENT DOCUMENTS 7,139,031 B1 * 11/2006 Bray ................... H04N 21/4542
                                                  704/E15.045
8,131,545 B1 *  3/2012 Moreno ................. G10L 15/04
                                                  704/235

(Continued)

FOREIGN PATENT DOCUMENTS

CN      102348071 A    2/2012
CN      103761985 A    4/2014
(Continued)

OTHER PUBLICATIONS

International Search Report and Written Opinion in PCT/CN2021/107845, dated Sep. 28, 2021, 10 pages.

(Continued)

*Primary Examiner* — Neeraj Sharma
(74) *Attorney, Agent, or Firm* — ARENTFOX SCHIFF LLP

(57) ABSTRACT

The present disclosure provides a subtitle generation method and apparatus, a device, and a storage medium, and the method includes: in response to a subtitle generation triggering operation directed against at least one audio track in a target audio-video file, performing speech recognition on audio data on each audio track respectively to obtain text fragments corresponding to each audio track; and generating subtitles of the target audio-video file based on the text fragments corresponding to each audio track. Compared with a method of performing overall speech recognition on audio data on all audio tracks, in the present disclosure, independent speech recognition is performed on the audio (Continued)

---

In response to a subtitle generation triggering operation directed against at least one audio track in a target audio-video file, performing speech recognition on audio data on each audio track of the at least one audio track to obtain text fragments corresponding to each audio track — S101

Generating subtitles of the target audio-video file based on the text fragments corresponding to each audio track — S102 data on each audio track, and thus, the influences of the audio tracks on each other are avoided, so that more accurate speech recognition results can be obtained, thereby improving the accuracy of subtitles generated based on the speech recognition results.

15 Claims, 3 Drawing Sheets

(56) References Cited

U.S. PATENT DOCUMENTS

| | | | | |
|---|---|---|---|---|
| 11,070,891 | B1* | 7/2021 | Effinger | H04N 21/43072 |
| 11,183,194 | B2* | 11/2021 | Thomas | G10L 15/1815 |
| 11,211,053 | B2* | 12/2021 | Aronowitz | G10L 15/07 |
| 11,334,622 | B1* | 5/2022 | Buckley | G11B 27/031 |
| 11,347,379 | B1* | 5/2022 | Levit | H04N 21/234336 |
| 11,562,743 | B2* | 1/2023 | Shir | G10L 15/065 |
| 2003/0065503 | A1* | 4/2003 | Agnihotri | H04N 21/440236 704/7 |
| 2016/0105707 | A1 | 4/2016 | Chen et al. | |
| 2018/0018961 | A1* | 1/2018 | Lee | G10L 15/08 |
| 2018/0267772 | A1 | 9/2018 | Lee et al. | |
| 2018/0358052 | A1* | 12/2018 | Miller | G10L 15/26 |
| 2020/0126559 | A1* | 4/2020 | Ochshorn | G11B 27/031 |
| 2021/0064327 | A1* | 3/2021 | Ispahani | G06F 3/0484 |
| 2021/0165973 | A1* | 6/2021 | Kofman | G06F 40/30 |

FOREIGN PATENT DOCUMENTS

| | | |
|---|---|---|
| CN | 104575547 A | 4/2015 |
| CN | 105338394 A | 2/2016 |
| CN | 108924583 A | 11/2018 |
| CN | 111901538 A | 11/2020 |
| WO | 2005057906 A2 | 6/2005 |
| WO | 2011011623 A1 | 1/2011 |

OTHER PUBLICATIONS

Yin, Jung-Qi, "The Film and Television Production Based on Edius5," Computer & Network, 2010, No. 2, 4 pages.

* cited by examiner

SUBTITLE GENERATION METHOD AND APPARATUS, AND DEVICE AND STORAGE MEDIUM

CROSS-REFERENCE TO RELATED APPLICATION

The present application is a continuation of International Patent Application No. PCT/CN2021/107845, filed on Jul. 22, 2021, which claims priority of Chinese Patent Application No. 202010719394.1, filed on Jul. 23, 2020, and the entire content disclosed by the Chinese patent application and the International Patent Application is incorporated herein by reference as part of the present application for all purposes.

TECHNICAL FIELD

The present disclosure relates to the field of data processing, and in particular, to a subtitle generation method and apparatus, a device, and a storage medium.

BACKGROUND

Generating subtitles for an audio-video file means performing speech recognition on the audio-video file and taking recognition results as subtitles for the audio-video file.

At present, subtitles for an audio-video file are recognition results obtained by performing overall speech recognition on audio data on all audio tracks in the audio-video file. Because the audio data on different audio tracks may affect each other. For example, a plurality of audio tracks may all have audio data thereon in the same time period, and consequently, there may be a problem of failing to hear the audio clearly from the perspective of auditory feeling. Besides, if overall recognition is performed on the audio data on all the audio tracks in this time period, there may be a problem of inaccurate recognition, thus resulting in inaccurate subtitles generated for the audio-video file.

Therefore, the technical problem urgently needing to be solved at present is how to improve the accuracy of subtitles generated for an audio-video file.

SUMMARY

To solve or at least partially solve the above-mentioned technical problem, the present disclosure provides a subtitle generation method and apparatus, a device, and a storage medium, which can improve the accuracy of subtitles generated for an audio-video file.

In a first aspect, the present disclosure provides a subtitle generation method, and the method comprises: in response to a subtitle generation triggering operation directed against at least one audio track in a target audio-video file, performing speech recognition on audio data on each audio track of the at least one audio track respectively to obtain text fragments corresponding to each audio track; and generating subtitles of the target audio-video file based on the text fragments corresponding to each audio track.

In one optional implementation, each of all text fragments corresponding to the at least one audio track has a start display time and an end display time; and the generating subtitles of the target audio-video file based on the text fragments corresponding to each audio track comprises: comprehensively ranking the all text fragments based on the start display time of each text fragment of the all text fragments; judging whether the end display time of a previous text fragment in adjacent text fragments after comprehensively ranking is later than the start display time of a latter text fragment in the adjacent text fragments after comprehensively ranking; in response to the end display time of the previous text fragment being later than the start display time of the latter text fragment, compressing a display duration of the previous text fragment such that the end display time of the previous text fragment is not later than the start display time of the latter text fragment; and merging the all text fragments based on a time axis to generate the subtitles of the target audio-video file.

In one optional implementation, before the merging the all text fragments based on a time axis to generate the subtitles of the target audio-video file, the method further comprises: determining at least one text fragment, the start display time of which is the same, among the all text fragments and determining a text fragment having the latest end display time from the at least one text fragment; and deleting other text fragment(s) than the text fragment having the latest end display time from the at least one text fragment.

In one optional implementation, the method further comprises: updating the subtitles in response to an adjustment operation directed against the subtitles. The adjustment operation comprises at least one selected from a group consisting of an addition operation, a deletion operation, and a modification operation.

In one optional implementation, after the generating subtitles of the target audio-video file based on the text fragments corresponding to each audio track, the method further comprises: compressing a display duration of the subtitles of the target audio-video file based on a variable speed playback multiple of the target audio-video file.

In a second aspect, the present disclosure provides a subtitles generation apparatus, and the apparatus comprises: a recognition module, configured to, in response to a subtitle generation triggering operation directed against at least one audio track in a target audio-video file, perform speech recognition on audio data on each audio track of the at least one audio track respectively to obtain text fragments corresponding to each audio track; and a generation module, configured to generate subtitles of the target audio-video file based on the text fragments corresponding to each audio track.

In one optional implementation, each of the all text fragments corresponding to the at least one audio track has a start display time and an end display time; and the generation module comprises: a ranking sub-module, configured to comprehensively rank the all text fragments based on the start display time of each text fragment of the all text fragments; a judging sub-module, configured to judge whether the end display time of a previous text fragment in adjacent text fragments after comprehensively ranking is later than the start display time of a latter text fragment in the adjacent text fragments after comprehensively ranking; a compression sub-module, configured to, in response to the end display time of the previous text fragment being later than the start display time of the latter text fragment, compress a display duration of the previous text fragment such that the end display time of the previous text fragment is not later than the start display time of the latter text fragment; and a generation sub-module, configured to merge the all text fragments based on a time axis to generate the subtitles of the target audio-video file.

In one optional implementation, the apparatus further comprises: a determination module, configured to determine at least one text fragment, the start display time of which is the same, among the all text fragments and determine a text fragment having the latest end display time from the at least one text fragment; and a deletion module, configured to delete other text fragment(s) than the text fragment having the latest end display time from the at least one text fragment.

In a third aspect, the present disclosure provides a computer-readable storage medium, instructions are stored on the computer-readable storage medium, when the instructions are run on a terminal device, the terminal device is caused to implement the above-mentioned method.

In a fourth aspect, the present disclosure provides a device, comprising a memory, a processor, and a computer program stored on the memory and capable of running on the processor, and the processor executes the computer program to implement the above-mentioned method.

Compared with the prior art, the technical solutions provided in embodiments of the present disclosure have the following advantages:

An embodiments of the present disclosure provides a subtitle generation method, and according to the method, when a subtitle generation triggering operation directed against at least one audio track in a target audio-video file is received, speech recognition is performed on audio data on each audio track of the at least one audio track respectively to obtain text fragments corresponding to each audio track. Subtitles of the target audio-video file are then generated based on the text fragments corresponding to each audio track. Compared with a method of performing overall speech recognition on audio data on all audio tracks, in the embodiment of the present disclosure, independent speech recognition is performed on the audio data on each audio track, and thus, the influences of the audio tracks on each other are avoided, so that more accurate speech recognition results can be obtained, thereby further improving the accuracy of subtitles generated based on the speech recognition results.

BRIEF DESCRIPTION OF THE DRAWINGS

The accompanying drawings herein, which are incorporated in and constitute a part of the specification, illustrate the embodiments consistent with the present disclosure, and together with the specification, serve to explain the principles of the present disclosure.

In order to more clearly illustrate the embodiments of the present disclosure or the technical solution of the prior art, the drawings needed to be used in the description of the embodiments or the prior art will be briefly described below, It will be apparent to those of ordinary skill in the art that other drawings may be obtained based on these drawings without any creative effort.

DETAILED DESCRIPTION

In order to more clearly understand the above objectives, features, and advantages of the present disclosure, the solutions in the present disclosure will be further described below. It should be noted that the embodiments in the present disclosure and features in the embodiments may be combined with one another without conflict.

Many specific details are set forth in the following description to help fully understand the present disclosure. However, the present disclosure may also be implemented in other manners different from those described herein. Apparently, the embodiments in the specification are merely some rather than all of the embodiments of the present disclosure.

At present, subtitles of an audio-video file are recognition results obtained by performing overall speech recognition on audio data on all audio tracks in the audio-video file. However, the audio data on different audio tracks may affect each other, thus resulting in a problem that the recognition results obtained by performing the overall speech recognition on the audio-video file may be inaccurate.

Therefore, an embodiment of the present disclosure provides a subtitle generation method, in the method, independent speech recognition can be performed on the audio data on each audio track, and therefore, the influences of the audio tracks on each other are avoided, and the accuracy of speech recognition results is improved. Furthermore, subtitles for an audio-video file with higher accuracy can be generated based on the speech recognition results with higher accuracy.

Specifically, in the subtitle generation method provided by the embodiment of the present disclosure, when a subtitle generation triggering operation directed against at least one audio track in a target audio-video file is received, speech recognition is performed on audio data on each audio track of the at least one audio track to obtain text fragments corresponding to each audio track. Subtitles for the target audio-video file are then generated based on the text fragments corresponding to each audio track.

Figure 1:
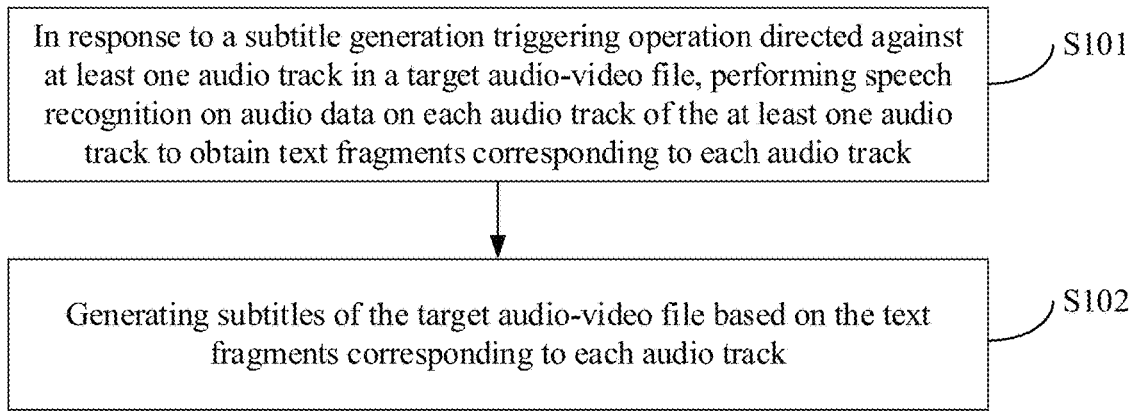
FIG. 1 is a flowchart of a subtitle generation method according to an embodiment of the present disclosure.

On this basis, an embodiment of the present disclosure provides a subtitle generation method. FIG. 1 is a flowchart of a subtitle generation method according to an embodiment of the present disclosure. The method includes steps described below.

S101: in response to a subtitle generation triggering operation directed against at least one audio track in a target audio-video file, performing speech recognition on audio data on each audio track of the at least one audio track to obtain text fragments corresponding to each audio track.

The target audio-video file in the embodiment of the present disclosure may be an audio file or a video file.

It should be noted that one audio track may also correspond to only one text fragment.

In practical application, the target audio-video file usually includes a plurality of audio tracks, in the embodiment of the present disclosure, the subtitle generation operation for the target audio-video file may be triggered for part of or all of the plurality of audio tracks, in other words, the at least one audio track may be part of or all of the all audio tracks included in the target audio-video file.

Figure 2:
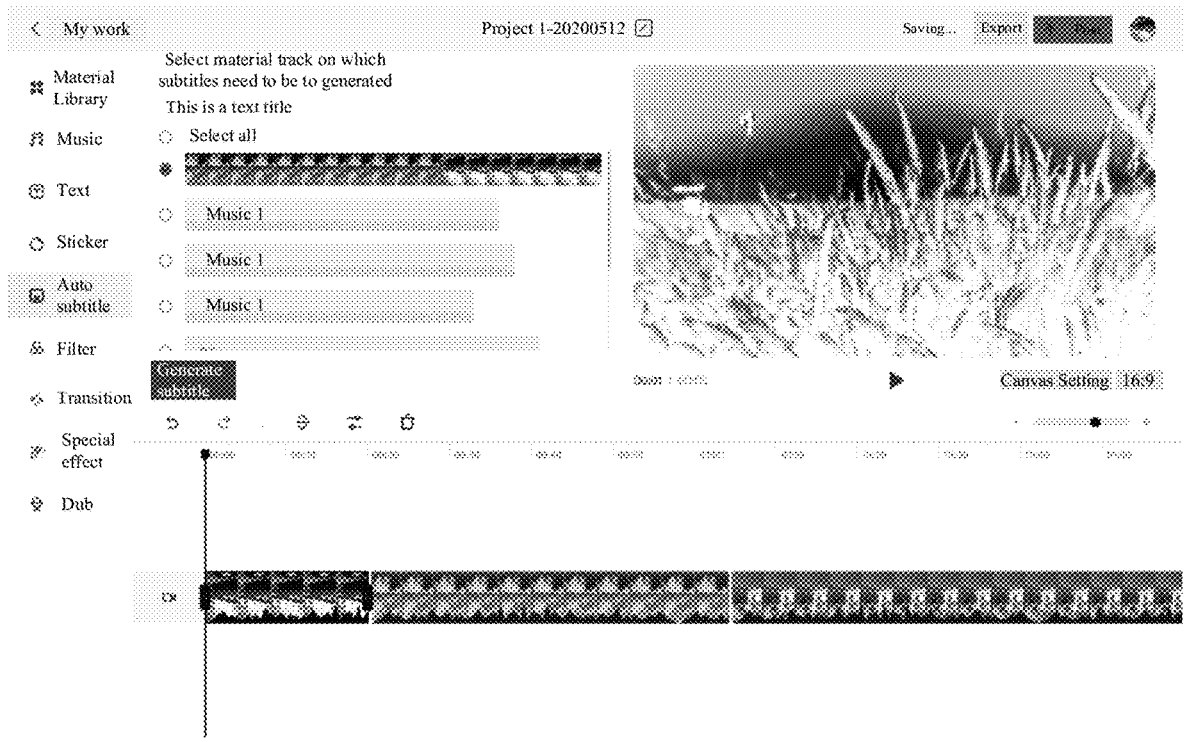
FIG. 2 is a schematic diagram of a subtitle generation interface according to an embodiment of the present disclosure.

In an alternative implementation, FIG. 2 is a schematic diagram of a subtitle generation interface according to an embodiment of the present disclosure. For example, a user may select one or more audio tracks shown in the interface and then click the button "generate subtitles", thereby triggering the operation of generating subtitles for the selected one or more audio tracks.

In the embodiment of the present disclosure, when the subtitle generation triggering operation for the at least one audio track in the target audio-video file is received, the audio data on each audio track of the at least one audio track is determined, and then speech recognition is performed on the audio data on each audio track to obtain the text fragments corresponding to each audio track. The specific method of the speech recognition will not be described redundantly in the embodiment of the present disclosure.

In an alternative implementation, because the audio data on one audio track typically includes a plurality of audio clips, and the speech recognition is performed on each audio clip to obtain a text fragment corresponding to each audio clip. The respective text fragments corresponding to the audio clips belonging to the same audio track constitute the text fragments corresponding to the audio track. In other words, in the present disclosure, the text fragments corresponding to an audio track include respective text fragments respectively corresponding to a plurality of audio clips on the audio track, and the processing the text fragments corresponding to the audio track means processing the respective text fragments respectively corresponding to the plurality of audio clips on the audio track. The text fragments corresponding to each audio track are obtained after the speech recognition on the audio data on each of the selected at least one audio track is completed.

S102: generating subtitles of the target audio-video file based on the text fragments corresponding to each audio track.

In the embodiment of the present disclosure, the text fragments are merged based on a time axis to generate the subtitles for the target audio-video file after the text fragments corresponding to each audio track in the target audio-video file are obtained.

In practical application, because each audio clip on an audio track has a start time and an end time, and correspondingly, a text fragment corresponding to the audio clip also has a start display time and an end display time. Specifically, the start time of the audio clip serves as the start display time of the text fragment corresponding to the audio clip, and the end time of the audio clip serves as the end display time of the text fragment corresponding to the audio clip.

Because the display durations (i.e., the display duration indicates a time period from a start display time to an end display time) of different text fragments may coincide, in the embodiment of the present disclosure, before merging the text fragments, the text fragments are preprocessed firstly to facilitate subsequent merging of the text fragments.

In an alternative implementation, in order to facilitate the processing of each text fragment, before the text fragments are merged, the text fragments corresponding to each audio track are firstly comprehensively ranked based on the start display time of each text fragment. Usually, the earlier the start display time of a text fragment is, the higher comprehensive ranking position of the text fragment is.

After the comprehensively ranking, the display time of adjacent text fragments may overlap. It should to be noted that "adjacent text fragments" described herein refer to adjacent text fragments determined based on a comprehensive ranking relationship obtained after comprehensively ranking the all text fragments corresponding to one or more selected audio tracks based on the start display time of each text fragment. Therefore, for two text fragments to be judged in the adjacent text fragments obtained based on the comprehensive ranking above, in the embodiment of the present disclosure, a relationship between the end display time of the previous text fragment of the two text fragments to be judged and the start display time of the latter text fragment of the two text fragments to be judged needs to be judged, so as to perform preprocessing. For example, the "previous text fragment" described herein refers to the text fragment having the earlier start display time between the two text fragments to be judged, and the "latter text fragment" refers to the text fragment having the later start display time between the two text fragments to be judged. In other words, the start display time of the "previous text fragment" is earlier than that of the "latter text fragment".

For example, if the end display time of the previous text fragment is not later than the start display time of the latter text fragment, it indicates that the display time period of the previous text fragment and the display time period of the latter text fragment do not coincide. In contrast, if the end display time of the previous text fragment is later than the start display time of the latter text fragment, it indicates that the display time period of the previous text fragment and the display time period of the latter text fragment at least partially coincide. In this case, the display duration of the previous text fragment needs to be compressed such that the end display time of the previous text fragment is not later than the start display time of the latter text fragment, avoiding that the display time period of the previous text fragment and the display time period of the latter text fragment coincide.

Figure 3:
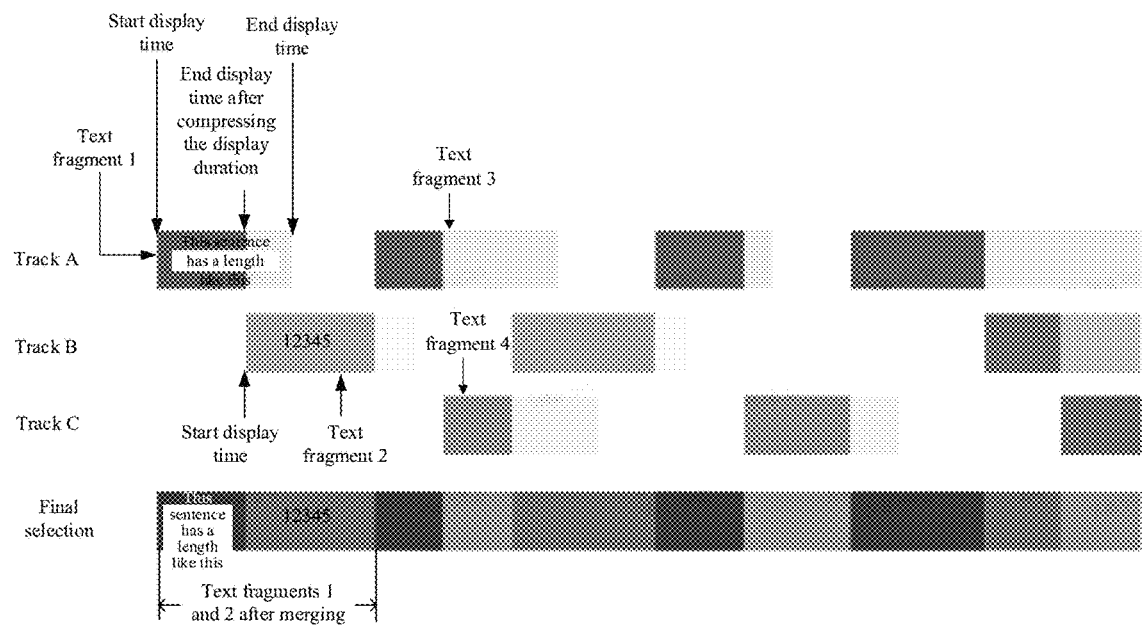
FIG. 3 is a schematic diagram of processing a text fragment according to an embodiment of the present disclosure.

FIG. 3 is a schematic diagram of processing a text fragment according to an embodiment of the present disclosure. As shown in FIG. 3, the selected audio tracks in the target audio-video file include a track A, a track B, and a track C. A plurality of rectangular blocks in the row of each track (the track A, the track B, or the track C) are used to represent the text fragments corresponding to each track, and each rectangular block is a text fragment. For example, the row where the track A is located includes four rectangular blocks, that is, the text fragments corresponding to the track A include four text fragments (e.g., including text fragments 1 and 3 shown in FIG. 3). The row where the track B is located includes three rectangular blocks, that is, the text fragments corresponding to the track B include three text fragments (e.g., including a text fragment 2 shown in FIG. 3). The row where the track C is located includes three rectangular blocks, that is, the text fragments corresponding to the track C include three text fragments (e.g., including a text fragment 4 shown in FIG. 3). Ranking is performed on the respective text fragments based on the start display time of the respective text fragments. As shown in FIG. 3, the text fragments corresponding to the track A includes the text fragments 1 and 3, the text fragments corresponding to the track B include the text fragment 2, and the text fragments corresponding to the track C include the text fragment 4, the start display time of the text fragment 1 is the earliest, followed by the start display time of the text fragment 2, the start display time of the text fragment 3, the start display time of the text fragment 4, and so on. The respective text fragments corresponding to the track A, the track B, and the track C are comprehensively ranked based on the start display time of the respective text fragment.

For example, a ranking relationship of the text fragments 1 to 4 after the above-mentioned comprehensively ranking may be as follows: the text fragment 1, the text fragment 2, the text fragment 3, and the text fragment 4. That is, the text fragment 1 is adjacent to the text fragment 2, the text fragment 2 is adjacent to the text fragment 1 and the text fragment 3, and the text fragment 3 is adjacent to the text fragment 2 and the text fragment 4. For example, as shown in FIG. 3, the text fragment 1 and the text fragment 2 are adjacent text fragments, and the text fragment 1 is the previous text fragment, while the text fragment 2 is the latter text fragment. Similarly, the text fragment 2 and the text fragment 3 are also adjacent text fragments, and the text fragment 2 is the previous text fragment, while the text fragment 3 is the latter text fragment, and so on.

For the adjacent text fragments after comprehensively ranking, it is judged whether the end display time of a previous text fragment is not later than the start display time of a latter text fragment. As shown in FIG. 3, the text fragment 1 and the text fragment 2 are the adjacent text fragments after comprehensively ranking, it is apparent that the end display time of the text fragment 1 is later than the start display time of the text fragment 2, resulting in that the display time period of the text fragment 1 and the display time period of the text fragment 2 partially coincide. Thus, in the embodiment of the present disclosure, the display duration of the text fragment 1 is compressed, and the end display time of the text fragment 1 is updated as the start display time of the text fragment 2 to avoid that the display time period of the text fragment 1 and the display time period of the text fragment 2 coincide. The compression of a display duration means completing the display of the same text fragment within a shorter display duration. For example, the text fragment 1 "This sentence has a length like this" in FIG. 3 needs to be displayed within a time period of the compressed display duration, i.e., within a time period determined by the start display time of the text fragment 1 and the start display time of the text fragment 2.

In the embodiment of the present disclosure, after the text fragments are preprocessed as described above, the text fragments are merged based on the time axis to generate the subtitles for the target audio-video file. As shown in FIG. 3, the text fragment 1 "This sentence has a length like this" corresponding to the track A is merged with the text fragment 2 "12345" corresponding to the track B to generate a finally selected subtitle.

In another alternative implementation, before the text fragments corresponding to the audio clips are merged, the text fragments having the same start display time are determined, if the text fragments having the same start display time are different in the end display time, the text fragment having the latest end display time is determined, the subtitles for the target audio-video file are generated based on this text fragment, and other text fragment(s) than the text fragment having the latest end display time is deleted from the text fragment(s) having the same start display time. In the embodiment of the present disclosure, subtitles are generated based on the text fragment having the latest end display time in the text fragment(s) having the same start display time, in other words, the subtitles are generated based on a text fragment having a longer display duration so that missing of subtitle contents can be avoided as far as possible.

In an alternative implementation, after the other text fragment(s) than the text fragment having the latest end display time is deleted from the text fragments having the same start display time, the step of comprehensively ranking the text fragments corresponding to each audio track based on the start display time of each text fragment is continuously performed on other text fragments. After the above-described preprocessing operation of the text fragments, the subtitles for the target audio-video file are generated.

It will be understood that if only one audio track in the target audio-video file is selected for generating subtitles for the target audio-video file, the problem that the display time periods of the text fragments coincide does not exist. Thus, the text fragments do not need to be merged, and the text fragments corresponding to the audio track are directly used as the subtitles of the target audio-video file.

In the subtitle generation method provided by the embodiment of the present disclosure, when the subtitle generation triggering operation directed against at least one audio track in the target audio-video file is received, speech recognition is performed on the audio data on each audio track of the at least one audio track respectively to obtain the text fragments corresponding to each audio track. Subtitles for the target audio-video file are then generated based on the text fragments corresponding to each audio track. Compared with a method of performing overall speech recognition on audio data on all audio tracks, in the embodiment of the present disclosure, independent speech recognition is performed on the audio data on each audio track, and thus, the influences of the audio tracks on each other are avoided, so that more accurate speech recognition results can be obtained, thereby further improving the accuracy of the subtitles generated based on the speech recognition results.

Figure 4:
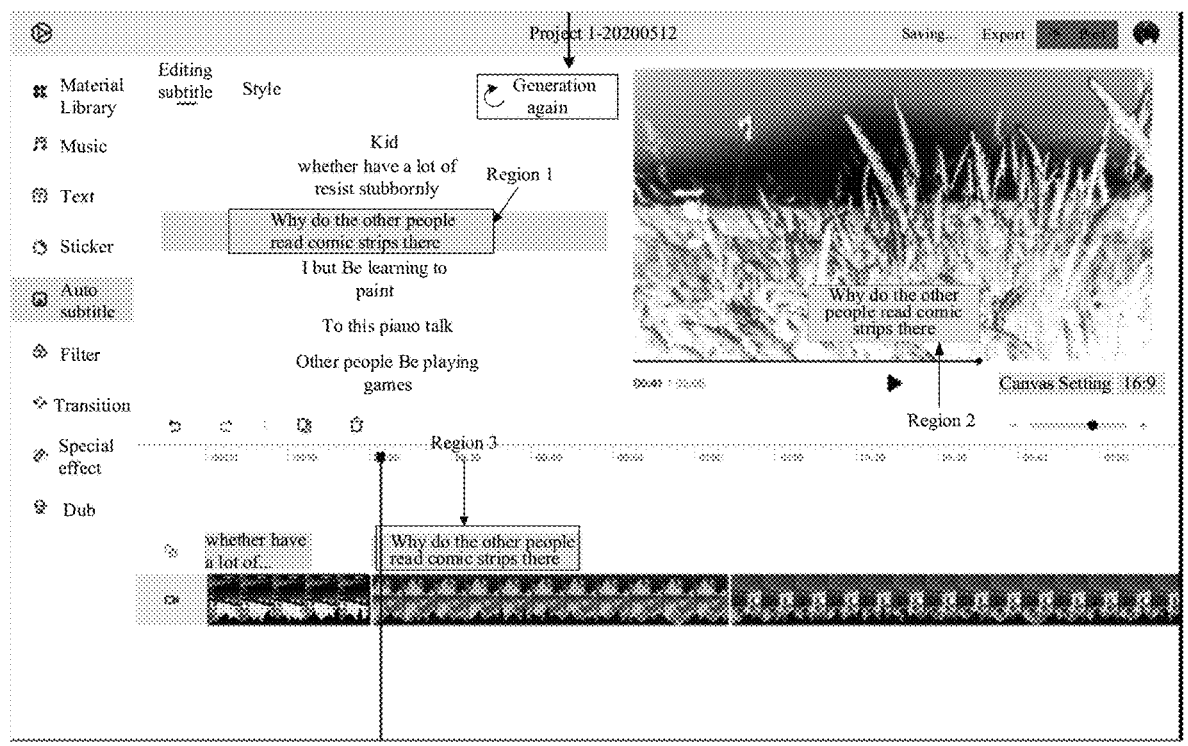
FIG. 4 is a schematic diagram of a subtitle display interface according to an embodiment of the present disclosure.

In an application scenario, after the subtitles of the target audio-video file are generated, the subtitles of the target audio-video file may be displayed based on the time axis according to a preset subtitle display mode. FIG. 4 is a schematic diagram of a subtitle display interface according to an embodiment of the present disclosure, the subtitles are displayed above the audio track in FIG. 4 based on the time axis. In addition, three regions (e.g., region 1, region 2, and region 3 in FIG. 4) in the subtitle display interface synchronously display a subtitle (e.g., "Why do the other people read comic strips there"). The texts in the subtitles of the target audio-video file may be displayed in a default font, color, font size, etc., thereby enhancing the display effect of the subtitles and further improving the user's experience.

In addition, the subtitles may also be adjusted in the embodiment of the present disclosure. Specifically, the display of the subtitles is updated after an adjustment operation directed against the subtitles is received. For example, the adjustment operation includes at least one selected from a group consisting of an addition operation, a deletion operation, and a modification operation.

Figure 5:
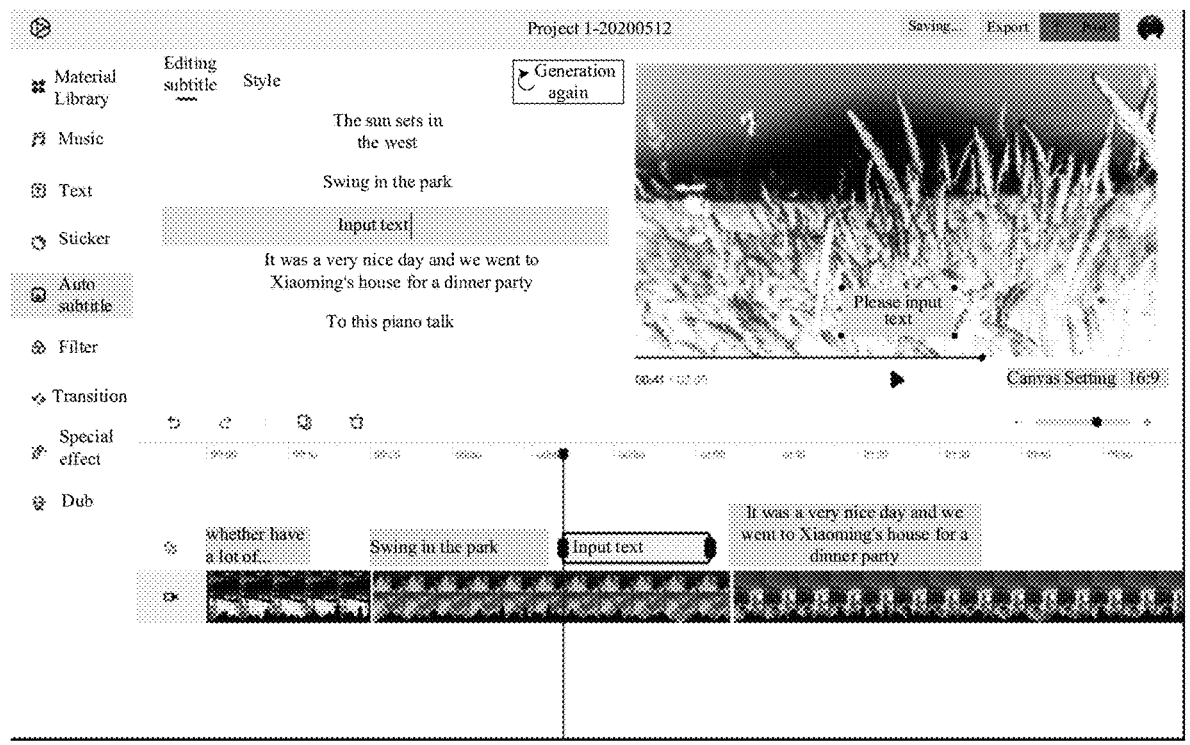
FIG. 5 is a schematic diagram of another subtitle display interface according to an embodiment of the present disclosure.

FIG. 5 is a schematic diagram of another subtitle display interface according to an embodiment of the present disclosure. For example, a user may click any text fragment in the displayed subtitles to trigger a modification or deletion operation directed against the text fragment and also to trigger an operation such as modifying the characteristics (e.g., font, color, and font size, etc.) of the text fragment. In addition, a user may also trigger the display of an input box by clicking a blank position in a subtitle display region. After the added subtitle content is input to the input box, the addition operation for the subtitles is triggered to achieve the addition of the subtitle content.

In practical application, a user may correct the generated subtitles as needed to obtain more accurate subtitles.

In another application scenario, if speed varying processing is performed on the target audio-video file, the display duration of the subtitles of the target audio-video file is compressed based on a variable speed playback multiple of the target audio-video file. The subtitles, the display duration of which is compressed, are displayed following with the playback of the target audio-video file after being performed the speed varying processing.

For example, assuming that the variable speed playback multiple of the target audio-video file is 2 times, the display duration of the subtitles of the target audio-video file is compressed proportionally to ½ of the original display duration.

Figure 6:
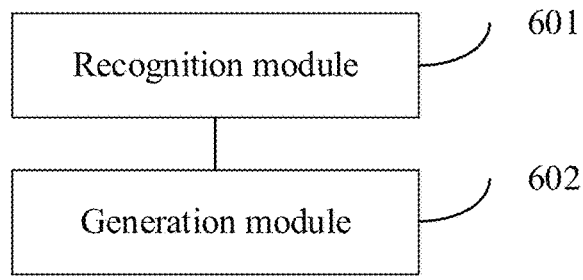
FIG. 6 is a structural block diagram of a subtitle generation apparatus according to an embodiment of the present disclosure.

Belonging to the same inventive concept with the above method embodiments, the present disclosure further provides a subtitles generation apparatus. Referring to FIG. 6, an embodiment of the present disclosure provides a subtitles generation apparatus, and the subtitles generation apparatus includes: a recognition module 601, configured to, in response to a subtitle generation triggering operation directed against at least one audio track in a target audio-video file, perform speech recognition on audio data on each audio track of the at least one audio track respectively to obtain text fragments corresponding to each audio track; and a generation module 602, configured to generate subtitles of the target audio-video file based on the text fragments corresponding to each audio track.

In an alternative implementation, each of all text fragments corresponding to the at least one audio track has a start display time and an end display time.

The generation module 602 includes: a ranking sub-module, configured to comprehensively rank the all text fragments based on the start display time of each text fragment of the all text fragments; a judging sub-module, configured to judge whether the end display time of a previous text fragment in adjacent text fragments after comprehensively ranking is later than the start display time of a latter text fragment in the adjacent text fragments after comprehensively ranking; a compression sub-module, configured to, in response to the end display time of the previous text fragment being later than the start display time of the latter text fragment, compress a display duration of the previous text fragment such that the end display time of the previous text fragment is not later than the start display time of the latter text fragment; and a generation sub-module, configured to merge the all text fragments based on a time axis to generate the subtitles of the target audio-video file.

In an alternative implementation, the apparatus further includes: an determination module, configured to determine at least one text fragment, the start display time of which is the same, among the all text fragments and determine a text fragment having the latest end display time from the at least one text fragment; and a deletion module, configured to delete other text fragments than the text fragment having the latest end display time from the at least one text fragment.

In an alternative implementation, the apparatus further includes: an updating module, configured to update the subtitles in response to an adjustment operation directed against the subtitles, and the adjustment operation includes at least one selected from a group consisting of an addition operation, a deletion operation, and a modification operation.

In an alternative implementation, the apparatus further includes: a time compression module, configured to compress a display duration of the subtitles of the target audio-video file based on a variable speed playback multiple of the target audio-video file.

In the subtitle generation apparatus provided by the embodiment of the present disclosure, when the subtitle generation triggering operation directed against at least one audio track in the target audio-video file is received, speech recognition is performed on the audio data on each audio track of the at least one audio track respectively to obtain the text fragments corresponding to each audio track. Subtitles for the target audio-video file are then generated based on the text fragments corresponding to each audio track. Compared with performing overall speech recognition on audio data on all audio tracks, in the embodiment of the present disclosure, independent speech recognition is performed on the audio data on each audio track, and thus, the influences of the audio tracks on each other are avoided, so that more accurate speech recognition results can be obtained, thereby further improving the accuracy of the subtitles generated based on the speech recognition results.

Figure 7:
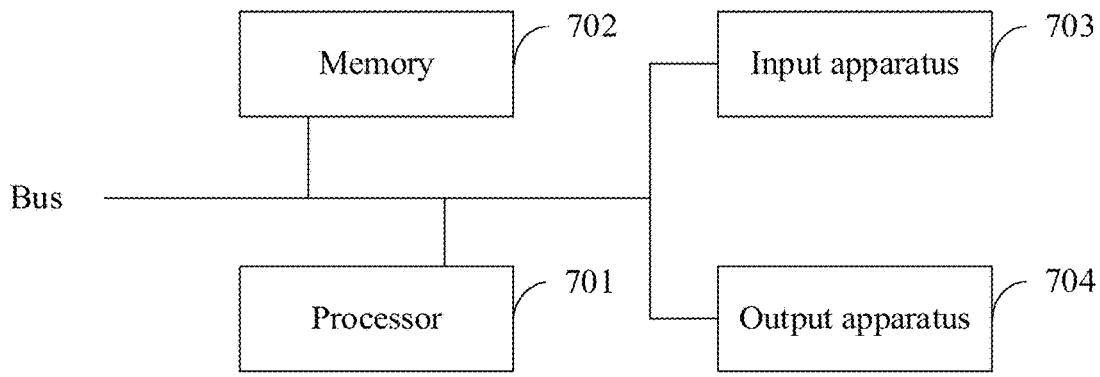
FIG. 7 is a structural block diagram of a device for generating subtitles according to an embodiment of the present disclosure.

In addition, an embodiment of the present disclosure further provides a device for generating subtitles. Referring to FIG. 7, the device may include: a processor 701, a memory 702, an input apparatus 703, and an output apparatus 704. The device for generating subtitles may have one or more processors 701, taking one processor as an example in FIG. 7. In some embodiments of the present disclosure, the processor 701, the memory 702, the input apparatus 703, and the output apparatus 704 may be connected by a bus or in other manners, and a case where the processor 701, the memory 702, the input apparatus 703, and the output apparatus 704 are connected by the bus in FIG. 7 is taken as an example.

The memory 702 may be configured to store software programs and modules. The processor 701 executes various functional applications and data processing of the device for generating subtitles by running the software programs and the modules stored on the memory 702. The memory 702 may mainly include a program storage area and a data storage area. The program storage area may store an operating system, an application program required by at least one function, etc. In addition, the memory 702 may include a high-speed random access memory, and may also include a non-volatile memory, for example, at least one magnetic disk storage device, a flash memory device, or other volatile solid storage device. The input device 703 may be configured to receive input digit or character information and generate signal inputs related to user settings and function control of the device for generating subtitles.

Specifically, in the embodiment, the processor 701 may load executable files corresponding to processes of one or more applications into the memory 702 according to the following instructions, and the processor 701 may run the applications stored on the memory 702, thereby implementing various functions of the above-described device for generating subtitles.

It should be noted that, in the present disclosure, relational terms, such as "first", "second", and the like, are only used to distinguish one entity or operation from another entity or operation and do not necessarily require or imply any such actual relationship or order between these entities or operations. In addition, terms "include", "comprise", or any other variations thereof are intended to cover non-exclusive inclusions, so that a process, a method, an article, or a device including a series of elements not only includes those elements, but also includes other elements that are not explicitly listed, or also includes inherent elements of the process, the method, the article, or the device. In the absence of further limitation, the element defined by the sentence "including a . . . " do not exclude the existence of other identical elements in the process, method, article, or device including the element.

What have been described above are only specific implementations of the present disclosure, allowing a person skilled in the art to understand or implement the present disclosure. Various modification to these embodiments will be apparent to those skilled in the art, and general principles defined herein can be achieved in the other embodiments without departing from the spirit or scope of the present disclosure. Thus, the present disclosure will not be limited to these embodiments described herein, but is intended to conform to the widest scope consistent with the principles and novel characteristics disclosed herein.

The invention claimed is:

1. A subtitle generation method, comprising:
in response to a subtitle generation triggering operation directed against at least one audio track in a target audio-video file, performing, speech recognition on audio data on each audio track of the at least one audio track respectively to obtain text fragments corresponding to each audio track; and
generating subtitles of the target audio-video file based on the text fragments corresponding to each audio track, wherein
each of all text fragments corresponding to the at least one audio track has a start display time and an end display time; and
the generating subtitles of the target audio-video file based on the text fragments corresponding to each audio track comprises:
comprehensively ranking the all text fragments based on the start display time of each text fragment of the all text fragments;
judging whether the end display time of a previous text fragment in adjacent text fragments after comprehensively ranking is later than the start display time of a latter text fragment in the adjacent text fragments after comprehensively ranking;
in response to the end display time of the previous text fragment being later than the start display time of the latter text fragment, compressing a display duration of the previous text fragment such that the end display time of the previous text fragment is not later than the start display time of the latter text fragment; and
merging the all text fragments based on a time axis to generate the subtitles of the target audio-video file.

2. The method according to claim 1, wherein before the merging the all text fragments based on a time axis to generate the subtitles of the target audio-video file, the method further comprises:
determining at least one text fragment, the start display time of which is same, among the all text fragments and determining a text fragment having the latest end display time from the at least one text fragment; and
deleting other text fragments than the text fragment having the latest display time from the at least one text fragment.

3. The method according to claim 1, wherein the method further comprises:
updating the subtitles in response to an adjustment operation directed against the subtitles, wherein the adjustment operation comprises at least one selected from a group consisting of an addition operation, a deletion operation, and a modification operation.

4. The method according to claim 2, wherein the method further comprises:
updating the subtitles in response to an adjustment operation directed against the subtitles, wherein the adjustment operation comprises at least one selected from a group consisting of an addition operation, a deletion operation, and a modification operation.

5. The method according to claim 1, wherein after the generating subtitles of the target audio-video file based on the text fragments corresponding to each audio track, the method further comprises:
compressing a display duration of the subtitles of the target audio-video file based on a variable speed playback multiple of the target audio-video file.

6. The method according to claim 2, wherein alter the generating subtitles of the target audio-video file based on the text fragments corresponding to each audio track, the method further comprises:
compressing a display duration of the subtitles of the target audio-video file based on a variable speed playback multiple of the target audio-video file.

7. The method according to claim 3, wherein after the generating subtitles of the target audio-video file based on the text fragments corresponding to each audio track, the method further comprises:
compressing a display duration of the subtitles of the target audio-video file based on a variable speed playback multiple of the target audio-video file.

8. A subtitles generation apparatus, comprising:
a recognition module, configured to, in response to a subtitle generation triggering operation directed against at least one audio track in a target audio-video file, perform speech recognition on audio data on each audio track of the at least one audio track respectively to obtain text fragments corresponding to each audio track; and
a generation module, configured to generate subtitles of the target audio-video file based on the text fragments corresponding to each audio track,
wherein each of the all text fragments corresponding to the at least one audio track has a start display time and an end display time; and
the generation module comprises:
a ranking sub-module, configured to comprehensively rank the all text fragments based on the start display time of each text fragment of the all text fragments;
a judging sub-module, configured to judge whether the end display time of a previous text fragment in adjacent text fragments after comprehensively ranking is later than the start display time of a latter text fragment in the adjacent text fragments after comprehensively ranking;
a compression sub-module, configured to, in response to the end display time of the previous text fragment being later than the start display time of the latter text fragment, compress a display duration of the previous text fragment such that the end display time of the previous text fragment is not later than the start display time of the latter text fragment; and
a generation sub-module, configured to merge the all text fragments based on a time axis to generate the subtitles of the target audio-video file.

9. The apparatus according to claim 8, wherein the apparatus further comprises:
a determination module, configured to determine at least one text fragment, the start display time of which is same, among the all text fragments and determine a text fragment having the latest end display time from the at least one text fragment; and a deletion module, configured to delete other text fragments than the text fragment having the latest end display time from the at least one text fragment.

10. The apparatus according to claim 8, further comprising:
an updating module, configured to update the subtitles in response to an adjustment operation directed against the subtitles, wherein the adjustment operation comprises at least one selected from a group consisting or an addition operation, a deletion operation, and a modification operation.

11. The apparatus according to claim 8, further comprising:
a time compression module, configured to compress a display duration of the subtitles of the target audio-video file based on a variable speed playback multiple of the target audio-video file.

12. A non-transitory computer-readable storage medium, wherein instructions are stored on the non-transitory computer-readable storage medium, when the instructions are run on a terminal device, the terminal device is caused to implement a subtitle generation method comprising:
in response to a subtitle generation triggering operation directed against at least one audio track in a target audio-video file, performing speech recognition on audio data on each audio track of the at least one audio track respectively to obtain text fragments corresponding to each audio track; and
generating subtitles of the target audio-video file based on the text fragments corresponding to each audio track,
wherein each of all text fragments corresponding to the at least one audio track has a start display time and an end display time; and
the generating subtitles of the target audio-video file based on the text fragments corresponding to each audio track comprises:
comprehensively ranking the all text fragments based on the start display time of each text fragment of the all text fragments;
judging whether the end display time of a previous text fragment in adjacent text fragments after comprehensively ranking is later than the start display time of a latter text fragment in the adjacent text fragments alter comprehensively ranking;
in response to the end display time of the previous text fragment being later than the start display time of the latter text fragment, compressing a display duration of the previous text fragment such that the end display time of the previous text fragment is not later than the start display time of the latter text fragment; and
merging the all text fragments based on a time axis to generate the subtitles of the target audio-video file.

13. The non-transitory computer-readable storage medium according to claim 12, wherein before the merging the all text fragments based on a time axis to generate the subtitles of the target audio-video file, the method further comprises:
determining at least one text fragment, the start display time of which is same, among the all text fragments and determining a text fragment having the latest end display time from the at least one text fragment; and
deleting other text fragments than the text fragment having the latest end display time from the at least one text fragment.

14. The non-transitory computer-readable storage medium according to claim 12, wherein the method further comprises:
updating the subtitles in response to an adjustment operation directed against the subtitles, wherein the adjustment operation comprises at least one selected from a group consisting of an addition operation, a deletion operation, and a modification operation.

15. A device, comprising a memory, a processor, and a computer program stored on the memory and capable of running on the processor, wherein the processor executes the computer program to implement the method according to claim 1.

* * * * *